United States Patent
Ramian et al.

(10) Patent No.: US 10,965,441 B1
(45) Date of Patent: Mar. 30, 2021

(54) FRAME TRIGGER RECREATION METHOD AND FRAME TRIGGER RECREATOR

(71) Applicant: Rohde & Schwarz GmbH & Co. KG, Munich (DE)

(72) Inventors: Florian Ramian, Karlsfeld (DE); Florian Lang, Gilching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/598,766

(22) Filed: Oct. 10, 2019

(51) Int. Cl.
*H04L 7/00* (2006.01)

(52) U.S. Cl.
CPC .................. *H04L 7/0087* (2013.01)

(58) Field of Classification Search
CPC ........... H04J 3/0632; H04L 2012/5674; H04L 7/0008; H03L 7/1974; H04N 21/4305
See application file for complete search history.

(56) References Cited

U.S. PATENT DOCUMENTS

| 6,473,439 | B1* | 10/2002 | Zerbe | ........................ G06F 1/12 370/503 |
| 7,508,844 | B2 | 3/2009 | Amagai | |
| 8,130,884 | B2 | 3/2012 | Joung et al. | |
| 2012/0155569 | A1* | 6/2012 | Ward | ..................... G01S 13/878 375/295 |
| 2016/0212702 | A1* | 7/2016 | Ghosh | ................. H04W 56/001 |
| 2018/0288723 | A1* | 10/2018 | Cai | ........................ H04J 13/004 |

FOREIGN PATENT DOCUMENTS

| CN | 106018910 A | 10/2016 |
| EP | 1 885 080 B1 | 2/2008 |
| JP | 2002198978 A | 7/2002 |
| KR | 100791823 B1 | 1/2008 |
| WO | 200505997 A1 | 1/2005 |

* cited by examiner

*Primary Examiner* — Khanh C Tran
(74) *Attorney, Agent, or Firm* — Ditthavong, Steiner & Mlotkowski

(57) ABSTRACT

A frame trigger recreation method is provided. Said frame trigger recreation method comprises the steps of generating a periodic trigger on the basis of a receiver clock with at least one period adjustment and at least one offset based on a difference between the receiver clock and a transmitter clock.

19 Claims, 4 Drawing Sheets

---

Generate a periodic trigger on the basis of a receiver clock with at least one period adjustment — 100

Generate at least one offset based on a difference between the receiver clock and a transmitter clock — 101

FRAME TRIGGER RECREATION METHOD AND FRAME TRIGGER RECREATOR

TECHNICAL FIELD

The invention relates to a frame trigger recreation method and a frame trigger recreator.

BACKGROUND ART

Generally, in times of an increasing number of applications providing wireless communication capabilities, there is a growing need of a frame trigger recreation method and a frame trigger recreator because exemplarily in the context of performing over-the-air measurements, a frame trigger is obligatory in order to verify correct functioning of said applications in a highly accurate and efficient manner. Unfortunately, in many situations, said frame trigger is not provided by the application to be tested.

U.S. Pat. No. 8,130,884 B2 discloses an apparatus and a method for synchronizing a signal analyzer. The apparatus includes an Analog-to-Digital Converter (ADC), a signal storage unit, a trigger signal generation unit, a signal acquisition control unit, a signal analysis unit, and a time error control unit. The ADC converts the input signal into a corresponding digital signal. The signal storage unit stores therein the digital signal received from the ADC. The trigger signal generation unit generates a trigger signal for each predetermined period. The signal acquisition control unit acquires the digital signal from a signal acquisition time point. The signal analysis unit calculates the start position of a frame from the digital signal. The time error control unit calculates a time error between the time point at which each trigger signal is generated and the start position of the digital signal, and sets a subsequent signal acquisition time point based on the calculated time errors. Disadvantageously, said apparatus and method are not only rather complex, which leads to inefficiency, but do also not allow for recreating a frame trigger being obligatory for particularly accurate measurements.

Accordingly, there is a need to provide a frame trigger recreation method and a frame trigger recreator, which provide a frame trigger being necessary for performing measurements in a highly accurate and efficient manner.

SUMMARY OF THE INVENTION

According to a first aspect of the invention, a frame trigger recreation method is provided. Said frame trigger recreation method comprises the step of generating a periodic trigger on the basis of a receiver clock with at least one period adjustment and at least one offset based on a difference between the receiver clock and a transmitter clock. Advantageously, both a high accuracy and a high efficiency can be ensured. Further advantageously, a frame may especially comprise or be a period of time, wherein a set of certain signal characteristics repeats. As a further advantage, the clock that matters may especially be the transmitter clock. In this context, it is noted that the signal of the transmitter may preferably be measured.

According to a first preferred implementation form of the first aspect of the invention, the periodic trigger is generated within a receiver hardware. Advantageously, for instance, efficiency can further be increased.

According to a second preferred implementation form of the first aspect of the invention, the frame trigger recreation method further comprises the step of determining a period of a frame based on knowledge of respective signal characteristics. Advantageously, for example, accuracy can further be increased.

According to a further preferred implementation form of the first aspect of the invention, the frame trigger recreation method further comprises the steps of demodulating a signal and searching for at least one frame start symbol or especially in the case of a pulsed signal, searching for at least one rising edge in the respective power. Advantageously, for instance, inaccuracy can further be reduced.

According to a further preferred implementation form of the first aspect of the invention, the frame trigger recreation method further comprises the step of determining a trigger offset based on a measurement between internal periodic trigger and a start of frame. Advantageously, for example, not only accuracy but also efficiency can further be increased.

According to a further preferred implementation form of the first aspect of the invention, the frame trigger recreation method further comprises the step of determining a period by measuring a time interval between two starts of frames. Advantageously, for instance, inaccuracy and inefficiency can be reduced further.

According to a further preferred implementation form of the first aspect of the invention, the measurement with respect to the period provides information on a transmitter clock reference. Advantageously, for example, accuracy can further be increased.

According to a further preferred implementation form of the first aspect of the invention, the knowledge of respective signal characteristics comprises a user input, preferably a user input of at least one signal type. Advantageously, for instance, the at least one signal type may especially comprise or be a long term evolution (LTE) signal or a new radio (NR) signal.

According to a further preferred implementation form of the first aspect of the invention, the knowledge of respective signal characteristics comprises the step of comparing a respective input signal to at least one known signal type. Advantageously, for example, said comparison may especially comprise data labeling preferably based on artificial intelligence.

According to a further preferred implementation form of the first aspect of the invention, for a real-time operating system, a trigger, preferably the periodic trigger, comprises or is a trigger event in software. Advantageously, for instance, efficiency can further be increased.

According to a further preferred implementation form of the first aspect of the invention, the frame trigger recreation method further comprises the step of reusing a trigger event in a measurement comprising no reference to the transmitter clock. Advantageously, said measurement may especially comprise or be an adjacent channel leakage power ratio (ACLR) measurement. Further advantageously, in the context of ACLR, there may especially be no demodulation.

According to a further preferred implementation form of the first aspect of the invention, the frame trigger recreation method further comprises the step of adjusting a trigger offset and/or a trigger period preferably by a user. Advantageously, for instance, complexity can further be reduced, thereby also reducing inefficiency.

According to a further preferred implementation form of the first aspect of the invention, the frame trigger recreation method further comprises the step of automatically determining the trigger offset and/or the trigger period preferably with the aid of software. Advantageously, for example, both accuracy and efficiency can further be increased.

According to a second aspect of the invention, a frame trigger recreator is provided. Said frame trigger recreator comprises a controller, wherein the controller is configured to generate a periodic trigger on the basis of a receiver clock with at least one period adjustment and at least one offset based on a difference between the receiver clock and a transmitter clock. Advantageously, both a high accuracy and a high efficiency can be ensured. Further advantageously, a frame may especially comprise or be a period of time, wherein a set of certain signal characteristics repeats. As a further advantage, the clock that matters may especially be the transmitter clock. In this context, it is noted that the signal of the transmitter may preferably be measured.

According to a first preferred implementation form of the second aspect of the invention, the periodic trigger is generated within a receiver hardware. Advantageously, for instance, efficiency can further be increased.

According to a second preferred implementation form of the second aspect of the invention, the controller is further configured to determine a period of a frame based on knowledge of respective signal characteristics. Advantageously, for example, accuracy can further be increased.

According to a further preferred implementation form of the second aspect of the invention, the controller is further configured to demodulate a signal and to search for at least one frame start symbol or especially in the case of a pulsed signal, to search for at least one rising edge in the respective power. Advantageously, for instance, inaccuracy can further be reduced.

According to a further preferred implementation form of the second aspect of the invention, the controller is further configured to determine a trigger offset based on a measurement between internal periodic trigger and a start of frame. Advantageously, for example, not only accuracy but also efficiency can further be increased.

According to a further preferred implementation form of the second aspect of the invention, the controller is further configured to determine a period by measuring a time interval between two start of frames. Advantageously, for instance, inaccuracy and inefficiency can further be reduced.

According to a further preferred implementation form of the second aspect of the invention, the measurement with respect to the period provides information on a transmitter clock reference. Advantageously, for example, accuracy can further be increased.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Before some exemplary embodiments of the invention will be explained in detail, a few further aspects of the invention are noted in the following for the sake of completeness:

The invention may especially employ a time or heartbeat trigger preferably with automatic tuning and configuration from a signal demodulation measurement.

It is noted that a typical time trigger may especially be implemented in software or hardware. When implemented in hardware, it may preferably be locked to a receiver reference clock, rather than to a transmitter reference clock. Additionally, the invention may especially automatically tune the time or heartbeat trigger to the measured transmitter clock or reference frequency preferably from a carrier frequency or sample rate error measurement.

Moreover, locking the time trigger to the transmitter clock may especially be essential since the virtual frame trigger should correlate to the received signal not only during configuration but also after a time T which is ideally very long (minutes, hours or even longer).

Furthermore, an automatic configuration of the periodicity, exemplarily from standard or measurement, as well as the trigger offset, exemplarily a frame start offset from a trigger event, may especially provide a significantly improved user experience.

It is further noted that a precise virtual frame trigger does not only allow radio frequency measurements over frequency spans larger than the analysis bandwidth, exemplarily ACLR, but also provides significant speed advantage for demodulation measurements.

Advantageously, the respective instrument only needs to capture solely the amount of data to be analyzed, whereas today the application captures at least twice the frame length so that it can synchronize and make sure at least one full frame is in the capture.

Further advantageously, the inventive frame trigger recreation method and frame trigger recreator especially recover the transmitter clock and create a virtual frame trigger based on the recovered clock and the frame offset.

Figure 1:
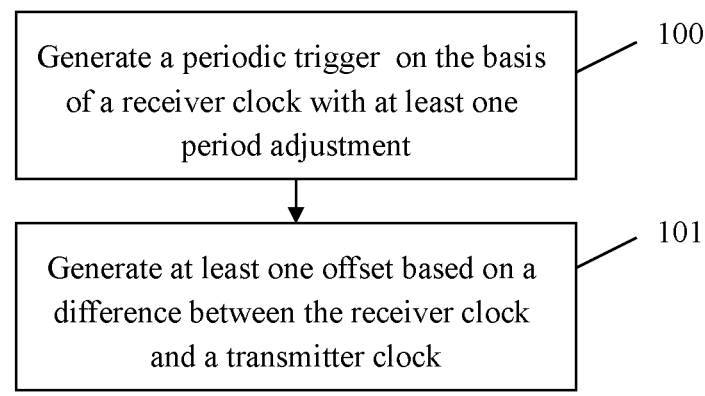
FIG. 1 shows a flow chart of an exemplary embodiment of the first aspect of the invention.

Now, as already announced above, with respect to exemplary embodiments of the invention, FIG. 1 shows a flow chart of an exemplary embodiment of the inventive frame trigger recreation method. In a first step 100, a periodic trigger is generated on the basis of a receiver clock with at least one period adjustment. Then, in a second step 101, at least one offset is generated based on a difference between the receiver clock and a transmitter clock.

Figure 2:
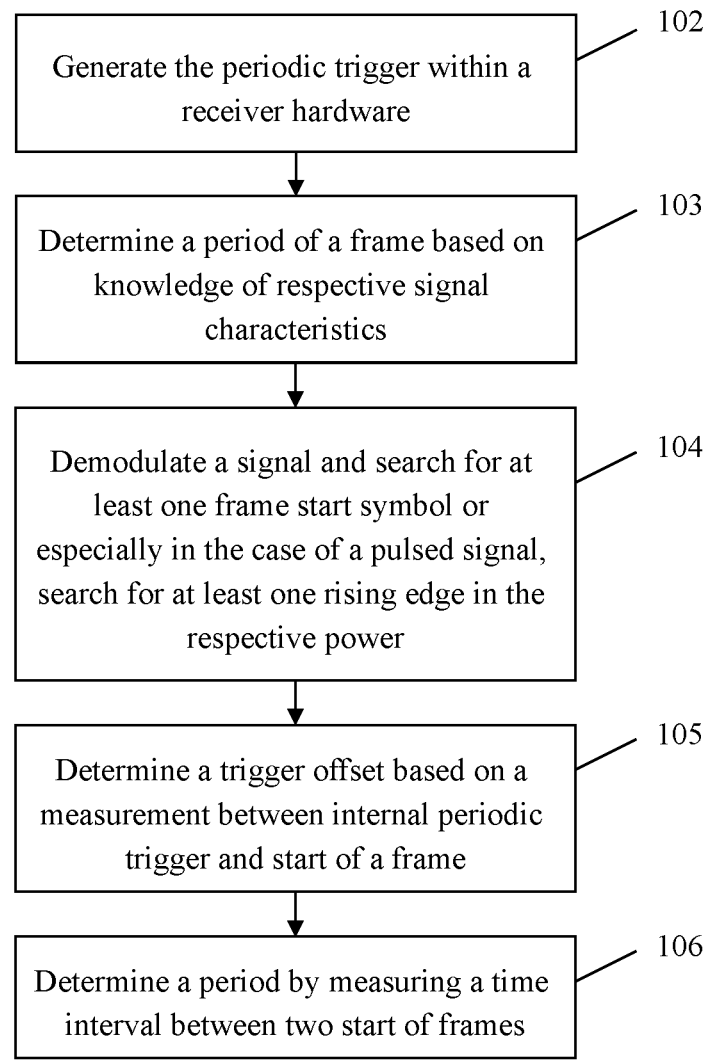
FIG. 2 shows a flow chart of a further exemplary embodiment of the first aspect of the invention.

Furthermore, in accordance with step 102 of FIG. 2, it might be particular advantageous if the frame trigger recreation method further comprises the step of generating the periodic trigger within a receiver hardware.

Moreover, according to step 103 of FIG. 2, the frame trigger recreation method may further comprise the step of determining a period of a frame based on knowledge of respective signal characteristics.

It is noted that according to step 104 of FIG. 2, the frame trigger recreation method may further comprise the steps of demodulating a signal and searching for at least one frame start symbol or especially in the case of a pulsed signal, searching for at least one rising edge in the respective power.

It is further noted that in accordance with step 105, the frame trigger recreation method may further comprise the step of determining a trigger offset based on a measurement between internal periodic trigger and a start of frame.

According to step 106 of FIG. 2, it might be particularly advantageous if the frame trigger recreation method further comprises the step of determining a period by measuring a time interval between two start of frames.

In this context, it is noted that the measurement with respect to the period may especially provide information on a transmitter clock reference. With respect to the above-mentioned knowledge of respective signal characteristics, the knowledge of respective signal characteristics may especially comprise a user input, preferably a user input of at least one signal type.

In addition to this or as an alternative, the knowledge of respective signal characteristics may especially comprise the step of comparing a respective input signal to at least one known signal type. Moreover, it might be particularly advantageous if for a real-time operating system, a trigger, preferably the periodic trigger, comprises or is a trigger event in software.

Figure 3:
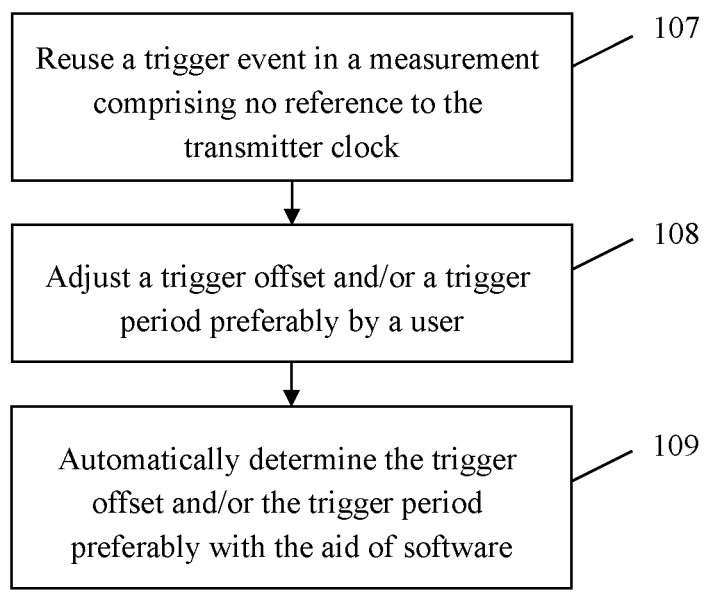
FIG. 3 shows a flow chart of a further exemplary embodiment of the first aspect of the invention.

Furthermore, in accordance with step 107 of FIG. 3, the frame trigger recreation method may further comprise the step of reusing a trigger event in a measurement comprising no reference to the transmitter clock.

It is further noted that according to step 108 of FIG. 3, the frame trigger recreation method may further comprise the step of adjusting a trigger offset and/or a trigger period preferably by a user.

In this context, in accordance with step 109 of FIG. 3, the frame trigger recreation method may further comprise the step of automatically determining the trigger offset and/or the trigger period preferably with the aid of software.

Figure 4:
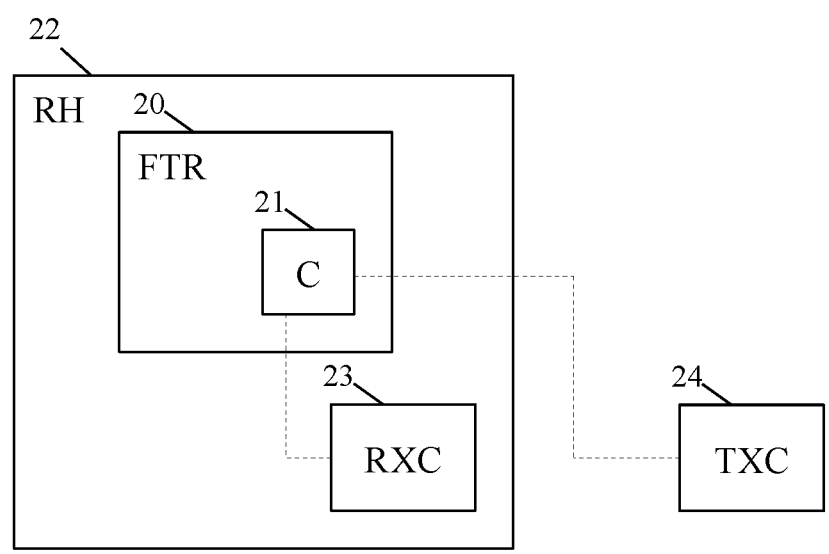
FIG. 4 shows an exemplary embodiment of the second aspect of the invention.

Finally, FIG. 4 illustrates an exemplary embodiment of the inventive frame trigger recreator 20 comprising a controller 21. In this context, the controller 21 is configured to generate a periodic trigger on the basis of a receiver clock 23 with at least one period adjustment and at least one offset based on a difference between the receiver clock and a transmitter clock 24.

Furthermore, it might be particularly advantageous if the periodic trigger is generated within a receiver hardware 22. Accordingly, in accordance with FIG. 4, the receiver hardware 22 may especially comprise the frame trigger recreator. It is further noted that the receiver hardware 22 may also comprise the receiver clock 23.

It might be particularly advantageous if the controller 21 is further configured to determine a period of a frame based on knowledge of respective signal characteristics. Furthermore, the controller 21 may especially be configured to demodulate a signal and to search for at least one frame start symbol or especially in the case of a pulsed signal, to search for at least one rising edge in the respective power.

Moreover, the controller 21 may especially be configured to determine a trigger offset based on a measurement between internal periodic trigger and a start of frame. In addition to this or as an alternative, it might be particularly advantageous if the controller 21 is further configured to determine a period by measuring a time interval between two starts of frames. In this context, the measurement with respect to the period may especially provide information on a transmitter clock reference.

With respect to the above-mentioned knowledge of respective signal characteristics, the knowledge of respective signal characteristics may especially comprise a user input, preferably a user input of at least one signal type. In this context, the controller 21 may further be configured to receive said user input.

It is further noted that the controller 21 may especially be configured to compare a respective input signal to at least one known signal type in order to provide the knowledge of respective signal characteristics. Furthermore, it might be particularly advantageous if for a real-time operating system, a trigger, preferably the periodic trigger, comprises or is a trigger event in software. Moreover, the controller 21 may be configured to reuse a trigger event in a measurement comprising no reference to the transmitter clock 24.

In addition to this or as an alternative, the controller 21 may especially be configured to adjust a trigger offset and/or a trigger period preferably by a user. In this context, it might be particularly advantageous if the controller 21 is configured to automatically determine the trigger offset and/or the trigger period preferably with the aid of software.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A frame trigger recreation method comprising the steps of:
   generating a periodic trigger on the basis of a receiver clock with at least one period adjustment and at least one offset based on a difference between the receiver clock and a transmitter clock, and
   reusing a trigger event in a measurement comprising no reference to the transmitter clock.

2. The frame trigger recreation method according to claim 1,
   wherein the periodic trigger is generated within a receiver hardware.

3. The frame trigger recreation method according to claim 1,
   further comprising the step of determining a period of a frame based on knowledge of respective signal characteristics.

4. The frame trigger recreation method according to claim 3,
   wherein the knowledge of respective signal characteristics comprises a user input, preferably a user input of at least one signal type.

5. The frame trigger recreation method according to claim 3,
   wherein the knowledge of respective signal characteristics comprises the step of comparing a respective input signal to at least one known signal type.

6. The frame trigger recreation method according to claim 1,
   further comprising the steps of demodulating a signal and searching for at least one frame start symbol or especially in the case of a pulsed signal, searching for at least one rising edge in the respective power.

7. The frame trigger recreation method according to claim 1,
   further comprising the step of determining a trigger offset based on a measurement between internal periodic trigger and a start of frame.

8. The frame trigger recreation method according to claim 1, further comprising the step of determining a period by measuring a time interval between two start of frames.

9. The frame trigger recreation method according to claim 8, wherein the measurement with respect to the period provides information on a transmitter clock reference.

10. The frame trigger recreation method according to claim 1, wherein for a real-time operating system, a trigger, preferably the periodic trigger, comprises or is a trigger event in software.

11. The frame trigger recreation method according to claim 1, further comprising the step of adjusting a trigger offset and/or a trigger period preferably by a user.

12. The frame trigger recreation method according to claim 11, further comprising the step of automatically determining the trigger offset and/or the trigger period preferably with the aid of software.

13. A frame trigger recreator comprising:
a controller,
wherein the controller is configured to generate a periodic trigger on the basis of a receiver clock with at least one period adjustment and at least one offset based on a difference between the receiver clock and a transmitter clock, and
wherein the controller is further configured to re-use a trigger event in a measurement comprising no reference to the transmitter clock.

14. The frame trigger recreator according to claim 13, wherein the periodic trigger is generated within a receiver hardware.

15. The frame trigger recreator according to claim 13, wherein the controller is further configured to determine a period of a frame based on knowledge of respective signal characteristics.

16. The frame trigger recreator according to claim 13, wherein the controller is further configured to demodulate a signal and to search for at least one frame start symbol or especially in the case of a pulsed signal, to search for at least one rising edge in the respective power.

17. The frame trigger recreator according to claim 13, wherein the controller is further configured to determine a trigger offset based on a measurement between internal periodic trigger and a start of frame.

18. The frame trigger recreator according to claim 13, wherein the controller is further configured to determine a period by measuring a time interval between two start of frames.

19. The frame trigger recreator according to claim 18, wherein the measurement with respect to the period provides information on a transmitter clock reference.

* * * * *